United States Patent
Park et al.

(10) Patent No.: US 9,185,664 B2
(45) Date of Patent: Nov. 10, 2015

(54) METHOD AND APPARATUS FOR POWER CONTROL AND LOAD BALANCING BASED ON LOAD ESTIMATION OF NEIGHBOR CELL IN WIRELESS COMMUNICATION SYSTEM

(75) Inventors: Young-Jun Park, Seoul (KR); Chung-Gu Kang, Seoul (KR); Hyon-Goo Kang, Gyeonggi-do (KR); Ki-Young Han, Gyeonggi-do (KR); Hye-Joong Kang, Seoul (KR)

(73) Assignees: Samsung Electronics Co., Ltd. (KR); Korea University Research and Business Foundation (KR)

( * ) Notice: Subject to any disclaimer, the term of this patent is extended or adjusted under 35 U.S.C. 154(b) by 238 days.

(21) Appl. No.: 13/451,167

(22) Filed: Apr. 19, 2012

(65) Prior Publication Data
US 2012/0270593 A1 Oct. 25, 2012

(30) Foreign Application Priority Data

Apr. 19, 2011 (KR) .................. 10-2011-0036024

(51) Int. Cl.
*H04W 52/40* (2009.01)
*H04W 52/34* (2009.01)
*H04W 52/14* (2009.01)

(52) U.S. Cl.
CPC .......... *H04W 52/343* (2013.01); *H04W 52/40* (2013.01); *H04W 52/146* (2013.01)

(58) Field of Classification Search
CPC .. H04W 52/241; H04W 52/343; H04W 52/40
USPC ............ 455/436, 405, 450, 452.1, 453, 522, 455/552.1
See application file for complete search history.

(56) References Cited

U.S. PATENT DOCUMENTS

| | | | |
|---|---|---|---|
| 6,983,153 B2 * | 1/2006 | Jain et al. ...................... | 455/453 |
| 7,327,707 B2 * | 2/2008 | Qi et al. ........................ | 370/331 |
| 7,957,359 B1 * | 6/2011 | Robson et al. ................ | 370/341 |
| 8,005,482 B2 * | 8/2011 | Tolli et al. .................... | 455/453 |
| 8,036,675 B2 * | 10/2011 | Chayat et al. ................. | 455/453 |
| 8,270,988 B1 * | 9/2012 | Sarkar et al. ................ | 455/452.1 |
| 8,462,807 B2 * | 6/2013 | Turk et al. .................... | 370/431 |
| 8,463,272 B2 * | 6/2013 | Yamamoto et al. ............ | 455/438 |
| 2005/0119006 A1 * | 6/2005 | Cave et al. .................... | 455/453 |
| 2007/0129071 A1 * | 6/2007 | Shapira ..................... | 455/422.1 |
| 2008/0311924 A1 * | 12/2008 | Lucidarme ................. | 455/452.1 |
| 2009/0075656 A1 * | 3/2009 | Tolli et al. .................... | 455/436 |
| 2009/0163223 A1 * | 6/2009 | Casey .......................... | 455/453 |
| 2010/0311435 A1 * | 12/2010 | Mueck et al. ................. | 455/453 |

* cited by examiner

*Primary Examiner* — Lewis West
(74) *Attorney, Agent, or Firm* — The Farrell Law Firm, P.C.

(57) ABSTRACT

A Base Station (BS) operation method for reducing load terminals based on load estimation of a neighbor cell in a wireless communication system includes receiving information for estimating a load of a neighbor BS, determining whether to determine the power control and handover terminal set using the number of terminals serviced by the neighbor BS, the number of overload terminals among the terminals serviced by the neighbor BS, and the backoff counter value, and, when it is determined to determine a power control and handover terminal set, deciding the power control and handover terminal set to minimize load terminals, based on the first power variation and the second power variation.

16 Claims, 12 Drawing Sheets

METHOD AND APPARATUS FOR POWER CONTROL AND LOAD BALANCING BASED ON LOAD ESTIMATION OF NEIGHBOR CELL IN WIRELESS COMMUNICATION SYSTEM

PRIORITY

This application claims priority under 35 U.S.C. §119(a) to a Korean Patent Application, which was filed in the Korean Intellectual Property Office on Apr. 19, 2011 and assigned Serial No. 10-2011-0036024, the content of which is incorporated herein by reference.

BACKGROUND OF THE INVENTION

1. Field of the Invention

The present invention generally relates to a wireless communication system, and more particularly, to a method and apparatus for power control and load balancing based on load estimation of a neighbor cell in a wireless communication system.

2. Description of the Related Art

A communication system for portable phones has conventionally employed a cellular scheme of dividing a service area into areas (cells) of a restricted range, deploying Base Stations (BSs) respectively, and performing communication with terminals within the cell. A 2nd-Generation (2G) mobile communication system based on the Frequency Division Multiple Access/Time Division Multiple Access (FDMA/TDMA) technology is employed in a method of changing a frequency allocated by a cell in order to prevent interference of a signal of a neighbor cell. Regarding this, in a 3rd-Generation (3G) mobile communication system based on the Code Division Multiple Access (CDMA) technology, the use of the same frequency was made possible even in a neighbor cell by interference resistance obtained by spectrum diffusion. The demand for higher-speed data communication is being expected in a 4th-Generation (4G) mobile communication system, and the use of the Orthogonal Frequency Division Multiplexing (OFDM) technology enabling high-speed data transmission using a broadband signal in a mobile communication environment is expected.

A cellular wireless communication system supports handover to support the mobility of terminals. When there is an increase of a load of a specific cell among a plurality of cells, the cellular wireless communication system performs load balancing for reducing a load of a corresponding cell. The cellular wireless communication system performs power control for maximizing BS capacity.

However, the conventional load balancing concept is for decreasing the load of the cell when there is a load increase within a specific cell, and cannot reduce the number of loaded terminals (hereinafter overload terminals) per cell from the overall system standpoint.

Therefore, there is a need for a method and apparatus for power control and load balancing for minimizing the sum of squares of the number of overload terminals per cell based on load estimation of a neighbor cell in a wireless communication system.

SUMMARY OF THE INVENTION

The present invention has been made to address at least the above problems and/or disadvantages and to provide at least the advantages described below. Accordingly, an aspect of the present invention provides a method and apparatus for power control and load balancing based on load estimation of a neighbor cell in a wireless communication system.

Another aspect of the present invention is to provide a method and apparatus for minimizing the sum of squares of the number of overload terminals per cell in a wireless communication system.

The above aspects are achieved by providing a method and apparatus for power control and load balancing based on load estimation of a neighbor cell in a wireless communication system.

According to one aspect of the present invention, a BS operation method for reducing load terminals based on load estimation of a neighbor cell in a wireless communication system includes receiving information for estimating a load of a neighbor BS, from each of a plurality of neighbor BSs, determining whether to determine the power control and handover terminal set using the number of terminals serviced by the neighbor BS, the number of overload terminals among the terminals serviced by the neighbor BS, and the backoff counter value, and, if it is determined to determine a power control and handover terminal set, deciding the power control and handover terminal set to minimize load terminals, based on the 1st power variation and the 2nd power variation.

According to another aspect of the present invention, a BS apparatus for reducing load terminals based on load estimation of a neighbor cell in a wireless communication system includes a receiver, a 1st determiner, and a controller. The receiver receives information for estimating a load of a neighbor BS, from each of a plurality of neighbor BSs. The information for estimating the load includes at least one or more of the number of terminals serviced by the neighbor BS, the number of overload terminals among the terminals serviced by the neighbor BS, a backoff counter value for considering fairness when selecting a BS that determines a power control and handover terminal set, a 1st power variation of the neighbor BS for increasing, by 'K' number, an overload terminal of the neighbor BS with respect to the number of terminals expected to do handover from the BS to the neighbor BS, and a 2nd power variation of the neighbor BS for decreasing, by 'K' number, the overload terminal of the neighbor BS with respect to the number of terminals expected to do handover from the BS to the neighbor BS. The 1st determiner determines whether to determine the power control and handover terminal set using the number of terminals serviced by the neighbor BS, the number of overload terminals among the terminals serviced by the neighbor BS, and the backoff counter value. If it is determined to determine a power control and handover terminal set, the controller determines the power control and handover terminal set to minimize load terminals, based on the 1st power variation and the 2nd power variation.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF EMBODIMENTS OF THE PRESENT INVENTION

Figure 1:
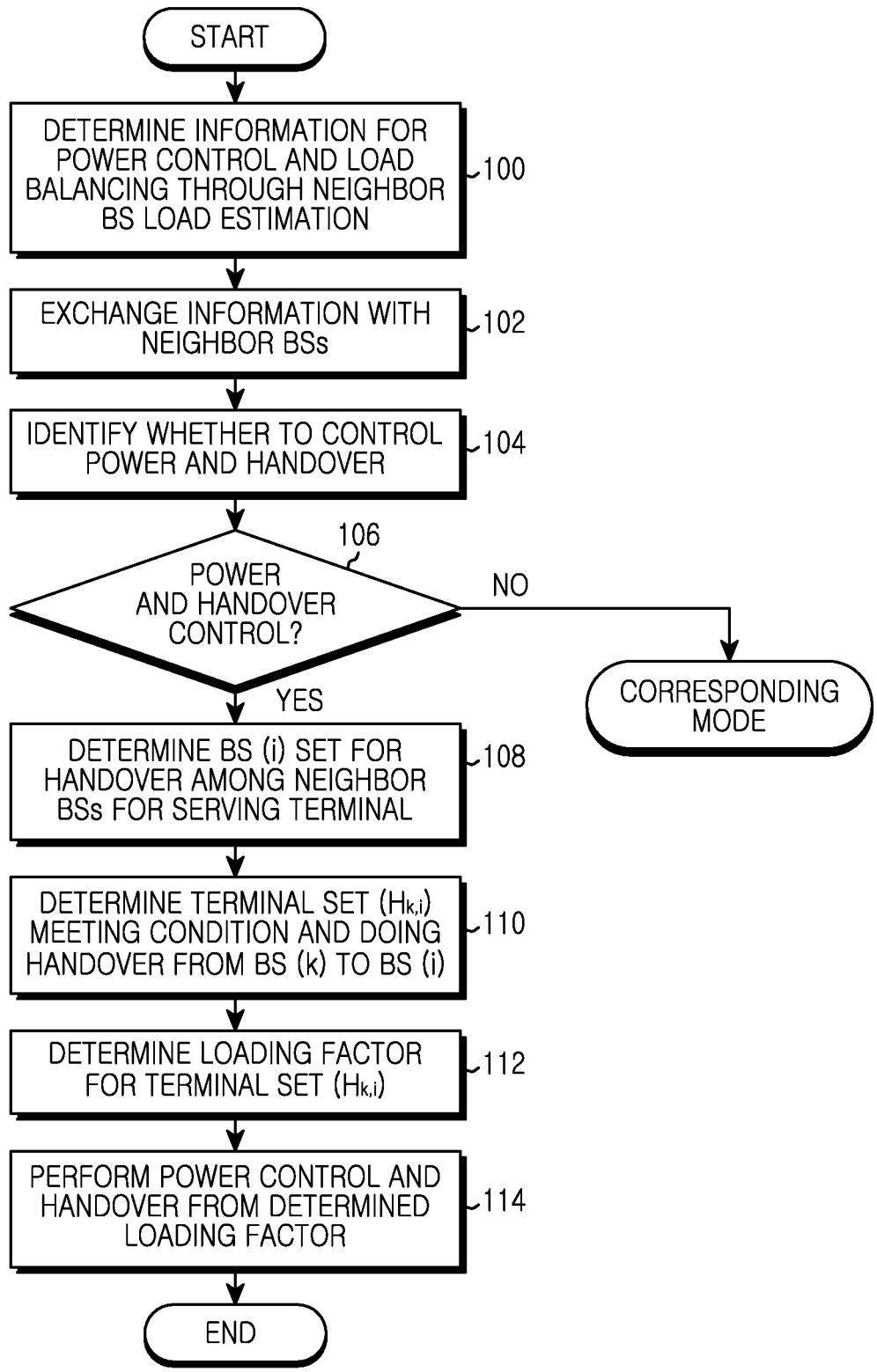
FIG. 1 illustrates a method for power control and load balancing based on load estimation of a neighbor cell in a wireless communication system according to an embodiment of the present invention.

Embodiments of the present invention are described in detail with reference to the accompanying drawings. The same or similar components may be designated by the same or similar reference numerals throughout the drawings. Detailed descriptions of constructions or processes known in the art may are omitted for the sake of clarity and conciseness. Terms described below, which are defined in considering the functionality of the present invention, may be different depending on user and operator intention or practice.

The present invention relates to a method and apparatus for deciding a set of terminals to perform power control and handover to simultaneously minimize by each BS a mean and variance of both the number of overload terminals and a neighbor BSs of a BS.

An overload terminal described in the present invention is defined below.

A multiple cellular network structure composed of BSs of $N_{eBS}$ number is considered. $U_i$ represents a set of terminals serviced by a BS (i). $\bar{I}_{i,j}(j \in U_i)$ represents an actual mean Signal-to-Interference plus Noise Ratio (SINR) of a signal that a terminal (j) receives from the BS (i). The present invention uses an SINR $\hat{I}_{i,j}(j \in U_i)$ that is an estimation of an SINR dependent on power change and the like using a mean value of each channel. The $\hat{I}_{i,j}(j \in U_i)$ is defined as in Equation (1) below.

$$\hat{I}_{i,j} = \frac{|\overline{h_{i,j}}|^2 p_i}{\sum_{k=1,k \neq i}^{N_{eNB}} |\overline{h_{k,j}}|^2 p_k + n} = \frac{\overline{S}_{i,j}}{\sum_{k=1,k \neq i}^{N_{eNB}} \overline{S}_{k,j} + n} \quad (1)$$

The $h_{i,j}$ represents a channel gain between a BS (i) and a terminal (j), and the $|\overline{h_{i,j}}|$ represents a mean of an absolute value. In addition, $\overline{S}_{i,j} = |\overline{h_{i,j}}|^2 p_i$ and the 'n' is thermal noise.

When generally using the Shannon capacity using an SINR, a mean band efficiency (bits/sec/Hz) of when each terminal (j) is serviced from a BS (i) can be given as in Equation (2) below.

$$c_{i,j} = \log_2(1 + \bar{I}_{i,j}) \quad (2)$$

However, in a system performing opportunistic scheduling for a plurality of users such as proportional fair scheduling, an SINR measuring in an allocated resource has a greater value than a mean SINR for the entire channel-time. Therefore, actual spectrum efficiency $c_{i,j}$ can be expressed using an SINR correction value $\beta_j$ and the entire correction value $\alpha'_j$ of the spectrum efficiency as in Equation (3) below.

$$\bar{c}_{i,j} = \alpha'_j \log_2(1 + \beta_j \bar{I}_{i,j}) \quad (3)$$

A mean throughput $\bar{r}_{i,j}$ of each terminal can be expressed by a multiplication of the mean frequency efficiency of Equation (3) above and a mean resource amount $\alpha_j$ allocated during a unit time as in Equation (4) below.

$$\bar{r}_{i,j} = \alpha_j \bar{c}_{i,j} = \alpha_j \alpha'_j \log_2(1 + \beta_j \bar{I}_{i,j}) \quad (4)$$

An estimated mean throughput $\hat{r}_{i,j}$ of a terminal (j) can be expressed using the mean SINR of Equation 4 above and Equation (1) above, as in Equation (5) below.

$$\hat{r}_{i,j} = \alpha_j \hat{c}_{i,j} = \alpha_j \alpha'_j \log_2(1 + \beta_j \hat{I}_{i,j}) \quad (5)$$

The $\alpha_j, \alpha'_j, \beta_j$ is assumed to be determined by a serving BS of the terminal (j), and all terminals serviced by the same BS are assumed to have the same value, respectively.

According to realization, the $\alpha_j, \alpha'_j, \beta_j$ is determined in an upper network entity and is forwarded to the serving BS of the terminal (j), and each terminal can have a different value.

Meanwhile, when a minimum requirement transmission rate of each terminal is equal to $\lambda_j$, a loading factor for when each terminal is being currently serviced from the serving BS is defined as in Equation (6) below.

$$L_j = u\left(\frac{\lambda_j}{\bar{r}_j}\right) \quad (6)$$

The 'u(x)' is given as $$u(x) = \begin{cases} 1 & \text{if } x \geq 1 \\ 0 & \text{if } x < 1 \end{cases}$$

and therefore, determines a load of a cell according to a weight that the minimum requirement transmission rate $\lambda_j$ occupies compared to a current transmission rate. The terminal (j) of $L_j > 1$ is referred to as an overload terminal.

A loading factor expected when a user (j) is serviced from a BS (i) can be estimated as in Equation (7) below.

$$\hat{L}_{i,j} = u\left(\frac{\lambda_j}{\hat{r}_{i,j}}\right) \quad (7)$$

An object of the present scheme is to minimize the sum of squares of the number of overload terminals per cell. The total sum of squares of the number of overload terminals in each cell is given as a square of a mean and a variance value as in Equation (8) below.

$$L = \frac{1}{N_{eNB}} \sum_{i=1}^{N_{eNB}} \left\{ \sum_{j \in U_i} L_j \right\}^2 \quad (8)$$

$$= \frac{1}{N_{eNB}} \sum_{i=1}^{N_{eNB}} \left\{ \sum_{j \in U_i} u\left(\frac{\lambda_j}{\bar{r}_j}\right) \right\}^2$$

$$= \left\{ \frac{1}{N_{eNB}} \sum_{i=1}^{N_{eNB}} \sum_{j \in U_i} u\left(\frac{\lambda_j}{\bar{r}_j}\right) \right\}^2 -$$

$$\left\{ \frac{1}{N_{eNB}} \sum_{i=1}^{N_{eNB}} \sum_{j \in U_i} u\left(\frac{\lambda_j}{\bar{r}_j}\right) \right\}^2$$

$$= \left\{ \frac{1}{N_{eNB}} \sum_{i=1}^{N_{eNB}} L^i \right\}^2 + \frac{1}{N_{eNB}} \sum_{i=1}^{N_{eNB}} \{L^i\}^2 -$$

$$\left\{ \frac{1}{N_{eNB}} \sum_{i=1}^{N_{eNB}} L^i \right\}^2$$

$$= \left( E\left[ \left\{ \sum_{j \in U_i} L_j \right\} \middle| i \in [1, N_{eNB}] \right] \right)^2 +$$

-continued $$\text{Var}\left[\left\{\sum_{j\in U_i} L_j\right\} \middle| i \in [1, N_{eNB}]\right]$$

Therefore, a load of the entire network according to power control and handover can be estimated as in Equation (9) below.

$$\hat{L} = \frac{1}{N_{eNB}}\sum_{i=1}^{N_{eNB}}\left\{\sum_{j\in U_i}\hat{L}_{i,j}\right\}^2 = \frac{1}{N_{eNB}}\sum_{i=1}^{N_{eNB}}\left\{\sum_{j\in U_i}\left(\frac{\lambda_j}{\hat{r}_{i,j}}\right)\right\}^2 = \frac{1}{N_{eNB}}\sum_{i=1}^{N_{eNB}}(\hat{L}^i)^2 \quad (9)$$

When each BS determines power control and handover or not on the basis of variance, each BS should be able to determine influence exerted to a neighbor cell by its own selecting power control and handover decision. That is, assuming the situation in which only one specific BS (i.e., a BS (k)) of the largest load performs power control and handover, in this case, the BS (k) has to determine its own power $p_k$ and a set of terminals $H_{k,i}$ performing a handover to a neighbor BS (i). Because only the BS (k) can currently determine handover of a terminal set $U_k$ that services through a handover parameter control of its own cell, assuming that a terminal doing handover to the BS (k) from the neighbor BS (i) according to power control is determined in compliance with a handover criterion set to the neighbor BS (i) on a basis of an SINR or a Received Signal Strength (RSS), the $H_{k,i}$ is determined by power $p^*_k$ of the BS (k) determined according to power control. Therefore, the '$H_{k,i}$' can be expressed as $H_{i,k}(p^*_k)$ that is a function of the power $p^*_k$.

For convenience of description, $\hat{i}$ denotes each BS (i) for when the $p^*_k$, $H_{k,i}$, and $H_{i,k}(p^*_k)$ are reflected. That is, a BS $\hat{k}$ is the physically same BS as the BS (k), but signifies a BS of $p_{\hat{k}}=p^*_k$ and having a service terminal set $U_{\hat{k}}$ such as Equation (10) below.

$$U_{\hat{k}} = U_k \cup \left[\bigcup_{i=1,i\neq k}^{N_{eNB}} H_{i,k}(p^*_k)\right] - \left[\bigcup_{i=1,i\neq k}^{N_{eNB}} H_{k,i}\right] \quad (10)$$

Similarly, the remnant BS $\hat{i}$ excepting the BS $\hat{k}$ among the entire BS is the physically the same as the BS (i), but signifies a BS of $p_{\hat{i}}=p^*_i$ and having a service terminal set $U_{\hat{i}}$ such as Equation (11) below.

$$U_{\hat{i}}=U_i \cup H_{k,i}-H_{i,k}(p^*_k) \quad (11)$$

Therefore, $\hat{L}_{i,j}$ signifies a value of Equation (12) below according to the definition of Equation 4 above.

$$\hat{L}_{i,j} = \frac{\lambda_j}{\hat{r}_{i,j}} = \frac{\lambda_j}{\alpha_i \log_2(1+\beta_i \hat{I}_{i,j})} \quad (12)$$

$$= \frac{\lambda_j}{\frac{1}{|U_i|}\log_2\left(1+\frac{\beta_i|\overline{h_{i,j}}|p_i}{\sum_{l=1,l\neq i}^{N_{eNB}}|\overline{h_{l,j}}|p_l+N_0}\right)}$$

$$= \frac{\lambda_j}{\frac{1}{|U_i|}\log_2\left(1+\frac{\beta_i S_{i,j}}{\sum_{l=1,l\neq i}^{N_{eNB}}S_{l,j}+N_0}\right)}$$

If using this, a mean load $\hat{L}^*(p^*_k, H_{k,i})$ of the entire cell can be expressed as in Equation (13) below when the $p^*_k$, $H_{k,i}$, and $H_{i,k}(p^*_k)$ are applied.

$$\hat{L}^*(p^*_k, H_{k,i}) = \frac{1}{N_{eNB}}\left[\sum_{i=1}^{N_{eNB}}\left\{\sum_{j\in U_i}\hat{L}_{i,j}(p^*_k)\right\}^2\right] \quad (13)$$

$$= \frac{1}{N_{eNB}}\left[\left\{\sum_{j\in U_{\hat{k}}}\hat{L}_{\hat{k},j}(p^*_k)\right\}^2 + \sum_{i=1,i\neq k}^{N_{eNB}}\left\{\sum_{j\in U_{\hat{i}}}\hat{L}_{\hat{i},j}(p^*_k)\right\}^2\right]$$

$$= \frac{1}{N_{eNB}}\left(\left(\sum_{j\in U_k \cup[\bigcup_{i=1,j\neq k}^{N_{eNB}}H_{I,K}(p^*_k)]-[\bigcup_{i=1,j\neq k}^{N_{eNB}}H_{k,i}]}\hat{L}_{\hat{k},j}(p^*_k)\right)^2 + \sum_{i=1,i\neq k}\left(\sum_{j\in U_i \cup H_{k,i}-H_{i,k}(p^*_k)}\hat{L}_{\hat{i},j}(p^*_k)\right)^2\right)$$

$$= \frac{1}{N_{eNB}}\left(\left(\sum_{j\in U_k \cup[\bigcup_{i=1,j\neq k}^{N_{eNB}}H_{K,J}]}\hat{L}_{\hat{k},j}(p^*_k)+\sum_{i=1,j\neq k}^{N_{eNB}}\sum_{j\in H_{i,k}(p^*_k)}\hat{L}_{\hat{k},j}(p^*_k)\right)^2 + \sum_{i=1,i\neq k}^{N_{eNB}}\left(\sum_{j\in U_i-H_{i,k}(p^*_k)}\hat{L}_{\hat{i},j}(p^*_k)+\sum_{j\in H_{k,i}}\hat{L}_{\hat{i},j}(p^*_k)\right)^2\right)$$

To obtain a determinable value in each of the BS (k) and the neighbor BS (i), each terms constituting Equation 13 above are distinguished as in Equation (14) to Equation (17) below.

$$\sum_{j\in U_k-[\bigcup_{i=1,i\neq k}^{N_{eNB}}H_{k,i}]}\hat{L}_{\hat{k},j}(p^*_k) \quad (14)$$

$$\sum_{j\in U_{i,k}(p^*_k)}\hat{L}_{\hat{k},j}(p^*_k)|_{i\in[1,N_{eNB}]-\{k\}} \quad (15)$$

$$\sum_{j\in U_i-H_{i,k}(p^*_k)}\hat{L}_{\hat{i},j}(p^*_k)|_{i\in[1,N_{eNB}]-\{k\}} \quad (16)$$

$$\sum_{j\in H_{k,i}}\hat{L}_{\hat{i},j}(p^*_k)|_{i\in[1,N_{eNB}]-\{k\}} \quad (17)$$

Equation (14) above represents the number of overload terminals among terminals excepting a terminal doing handover to a neighbor BS among $U_k$. Equation (15) above represents the number of terminals expected to be overloaded when being serviced from a BS (k) among terminals performing handover from a neighbor BS of a BS (k) to the BS (k). Equation (16) above represents the number of terminals that are overloaded due to power increase or decrease in a BS (k) amongst terminals excepting a terminal performing handover to the BS (k) among terminals $U_i$ originally serviced from a BS (i) neighboring on the BS (k). Equation (17) above represents the number of terminals expected to be overloaded in a neighbor BS (i) among terminals performing handover from a BS (k) to the neighbor BS (i).

The present invention describes that each BS performs determination on the basis of variance and therefore, Equation (14) to Equation (17) above should be able to be determined at least with only information of the BS (k). In reality, to determine values of Equation (14) to Equation (17) above, the BS (k) has to be able to determine the $H_{i,k}(p^*_k)$ dependent on $U_{\hat{k}}$, $U_{\hat{i}}$, and $p^*_k$. However, to determine the $H_{i,k}(p^*_k)$, the BS (k) has to know all of channel information of a terminal serviced by a neighbor BS, and even the neighbor BS which determines the $H_{i,k}(p^*_k)$ has to be able to know whether, when a terminal belonging to the $H_{i,k}(p^*_k)$ is serviced from the BS (k), the corresponding terminal will be overloaded.

Therefore, $H_{i,k}(p^*_k)=\phi$ is assumed for Equation (14) to Equation (17) above to make enable determination through information of the BS (k) or information exchange between some BSs. That is, assuming that there is no terminal performing handover from a neighbor BS (i) to a BS (k) though power of the BS (k) is controlled to the $p^*_k$, Equation (13) above is given as in Equation (18) below.

$$\hat{L}^*(p^*_k, H_{k,i}) = \frac{1}{N_{eNB}} \left[ \left( \sum_{j \in U_k - \left[ \bigcup_{i=1, i \neq k}^{N_{eNB}} H_{k,i} \right]} \hat{L}_{k,j}(p^*_k) \right)^2 + \sum_{i=1, i \neq k}^{N_{eNB}} \left\{ \sum_{j \in U_i} \hat{L}_{i,j}(p^*_k) + \sum_{j \in H_{k,i}} \hat{L}_{i,j}(p^*_k) \right\}^2 \right] \quad (18)$$

Therefore, Equation (14) to Equation (17) above constituting a mean load $\hat{L}^*(p^*_k, H_{k,i})$ of the entire cell are modified into Equation (19) to Equation (21) below.

$$\sum_{j \in U_k - \left[ \bigcup_{i=1, i \neq k}^{N_{eNB}} H_{k,i} \right]} \hat{L}_{k,j}(p^*_k) \quad (19)$$

$$\sum_{j \in U_l} \hat{L}_{l,j}(p^*_k)|_{l \in [1, N_{eNB}] - \{k\}} \quad (20)$$

$$\sum_{j \in H_{k,l}} \hat{L}_{l,j}(p^*_k)|_{l \in [1, N_{eNB}] - \{k\}} \quad (21)$$

Equation (19) above represents a value that can be determined based on channel information of a terminal serviced by a BS (k). Equation (20) above represents a value that is determinable if $|U_i|$ of a neighbor BS (i) is known. Equation (21) above cannot be determined in the BS (k), and is determined in the neighbor BS (i) of the BS (k). However, to determine Equation (20) above, even the neighbor BS (i) of the BS (k) should be able to know the $p^*_k$ and the $H_{k,i}(p^*_k)$ but, because the neighbor BS (i) cannot determine the $p^*_k$ and the $H_{k,i}(p^*_k)$, Equation (21) above represents a value that cannot be determined yet. To solve this, Equation (21) above is expressed by a variation from a previous state to a state reflecting a change of the BS (k) using a loading factor $\hat{L}^i$ of the neighbor BS (i), as in Equation (22) below.

$$\hat{L}^i + \left[ \sum_{j \in U_i} \hat{L}_{i,j}(p^*_k, |H_{k,i}|) - \hat{L}^i \right] = \quad (22)$$

$$\hat{L}^i + \Delta \hat{L}^i(p^*_k, |H_{k,i}|) = \hat{L}^i + \Delta \hat{L}^i(\Delta p_k, |H_{k,i}|)$$

Here, $$\Delta p_k = \frac{p^*_k}{p_k},$$

and the variation is given as $\Delta \hat{L}^i(\Delta p_k, |H_{k,i}|)$. That is, if $|H_{k,i}|$ is given, the neighbor BS (i) can determine a value of $\Delta \hat{L}^i(\Delta p_k, |H_{k,i}|)$ dependent on the $p^*_k$. Because the $\Delta \hat{L}^i(\Delta p_k, |H_{k,i}|)$ is an integer and is a non-increasing function for the $p^*_k$, the BS (k) can be allowed to determine Equation 21 above by each neighbor BS (i)'s transmitting a pair dependent on each $\Delta \hat{L}^i(\Delta p_k, |H_{k,i}|)$ to the BS (k) instead of delivering channel information of the entire self-cell user to the BS (k). However, because transmitting $(\Delta p_k, |H_{k,i}|)$ for all possible $\Delta \hat{L}^i(\Delta p_k, |H_{k,i}|)$ to the BS (k) causes an excessively large overhead, a method controlling this is required. Therefore, the present invention exchanges only the $(\Delta p_k, |H_{k,i}|)$ allowing $\Delta \hat{L}^i$ to have +K and −K, and also exchanges only the $\Delta p_k$ of when the $(\Delta p_k, |H_{k,i}|)$ has a value between [0, H−1], where K is a constant.

FIG. 1 illustrates a method for power control and load balancing based on load estimation of a neighbor cell in a wireless communication system according to an embodiment of the present invention.

Referring to FIG. 1, in step 100, a BS (k) determines information for power control and load balancing for neighbor BS load estimation.

The information includes the number $|U_k|$ of terminals serviced by the BS (k), the number $L_k$ of overload terminals among terminals serviced by the BS (k), a backoff counter $BO_k$ of the BS (k), a power variation $(\Delta p_i^{|H_{i,k}|})^+$ of a neighbor BS (i) increasing, by 'K' number, an overload terminal of the BS (k) with respect to each $|H_{i,k}|$ when the number $|H_{k}|$ of terminals expected to perform handover from the neighbor BS (i) neighboring on the BS (k) to the BS (k) has a value between [0, H−1], and a power variation $(\Delta p_i^{|H_{i,k}|})^-$ of the neighbor BS (i) decreasing, by 'K' number, the overload terminal of the BS (k) with respect to each $|H_{i,k}|$ when the number $|H_{i,k}|$ of terminals expected to perform handover from the neighbor BS (i) neighboring on the BS (k) to the BS (k) has a value between [0, H−1].

The $BO_k$ is a value for preventing the BS (k) from being continuously selected, and the $|U_k|$ can be known if the BS (k) checks the number of terminals to which it is connected, and the $L_k$ can be known if using a loading factor defined in Equation 6 above. A method for determining the $(\Delta p_i^{|H_{i,k}|})^+$ and $(\Delta p_i^{|H_{i,k}|})^-$ with respect to the $|H_{i,k}|$ between [0, H−1] is given in Equation (23) below. That is, $(\Delta p_i^{|H_{i,k}|})$ dependent on the $|H_{i,k}|$ between [0, H−1] is determined for each terminal (j) belonging to the $|U_k|$, as in Equation (23) below.

$$\Delta p_i^{|H_{i,k}|} = \frac{|\overline{h_{i,j}}|^2 p^*_i}{|\overline{h_{i,j}}|^2 p_i} = \frac{1}{|\overline{h_{i,j}}|^2 p_i} \left( \frac{\beta_i |\overline{h_{k,j}}|^2}{2^{\frac{\lambda_j}{\alpha_k^i}}} - N_0 - \sum_{i=1, l \neq i,k}^{N_{eNB}} |\overline{h_{l,j}}|^2 p_l \right) \quad (23)$$

At this time, the $(\Delta p_i^{|H_{i,k}|})^+$ selects a K-th small value of the terminal (j) of $\hat{L}_{k,j} \leq 1$, and the $(\Delta p_i^{|H_{i,k}|})^-$ selects a K-th large value of the terminal (j) of $\hat{L}_{\bar{k},j}>1$. If the terminal (j) of $\hat{L}_{\bar{k},j}\leq 1$ is less than 'K' which is a constant in number, $(\Delta p_i^{|H_{i,k}|})^+=\infty$ is selected and, if the terminal (j) of $\hat{L}_{\bar{k},j}>1$ is less than 'K' in number, $(\Delta p_i^{|H_{i,k}|})^+=0$ is selected.

The $BO_k$ is updated based on $BO_k=\max(0,BO_k-1)$ every predefined period.

A plurality of neighbor BSs (i) also determine the number $|U_i|$ of terminals that they respectively service, the number $L_i$ of overload terminals among terminals serviced by the neighbor BS (i), a backoff counter $BO_i$ of the neighbor BS (i), a power variation $(\Delta p_k^{|H_{k,i}|})^+$ of the BS (k) of increasing, by 'K' number, an overload terminal of the neighbor BS (i) with respect to each $|H_{k,i}|$ when the number $|H_{k,i}|$ of terminals expected to perform handover from the BS (k) neighboring on the neighbor BS (i) to the neighbor BS (i) has a value between [0, H−1], and a power variation $(\Delta p_k^{|H_{k,i}|})^-$ of the BS (k) of decreasing, by 'K' number, the overload terminal of the neighbor BS (i) with respect to each $|H_{k,i}|$ when the number $|H_{k,i}|$ of terminals expected to perform handover from the BS (k) neighboring on the neighbor BS (i) to the neighbor BS (i) has a value between [0, H−1].

After that, in step 102, the BS (k) exchanges the determined information with the plurality of neighbor BSs (i). For example, the BS (k) transmits the $|U_k|$, $L_k$, $BO_k$, $(\Delta p_i^{|H_{i,k}|})^+$, and $(\Delta p_i^{|H_{i,k}|})^-$ to the plurality of neighbors BSs (i), respectively, and receives the $|U_i|$, $L_i$, $BO_i$, $(\Delta p_k^{|H_{i,k}|})^+$, and $(\Delta p_k^{|H_{k,i}|})^-$ from the plurality of neighbor BSs (i), respectively.

In step 104, the BS (k) determines whether it will control power and handover based on a loading factor of the neighbor BS (i), i.e., the number $L_i$ of overload terminals of the neighbor BS (i).

That is, the BS (k) determines if the number of overload terminals is relatively large compared to the neighbor BS (i) based on Equation (24) below and, when the number of overload terminals of the BS (k) is large, the BS (k) controls power and handover. In contrast, when the number of overload terminals of the neighbor BS (i) is large, the neighbor BS (i) controls power and handover.

$$R_l = \frac{\hat{L}^l}{\max\left(\xi, \frac{1}{|NE_l|}\sum_{i\in NE_l}\hat{L}^i\right)} \quad (24)$$

Here, $l\in NE_k\cup\{k\}$ is given, and $\zeta>0$ is given. When the BS (k) is of $BO_k=0$ and $\{i|BO_i\neq 0, R_k<R_i \forall i\in NE_k\}=\phi$, it is determined to control a power and handover terminal set during this period. Because a $R_l$ value determined in a neighbor BS (l) of a BS (k) and a $R_l$ value determined in the BS (k) can be identical, when there is a BS of the same $R_l$ value, one can be selected based on a BS index.

When it is selected to control power and handover in step 106, the BS (k) proceeds to step 108 and determines a BS set $HA_j$ in which a mean SINR value $\tilde{I}_{i,j}$ of a terminal (j) ($j\in U_k$) is greater than a threshold value $\eta LB$. That is, the $HA_j$ is a BS set in which the mean SINR value $\tilde{I}_{i,j}$ of the terminal (j) is greater than the threshold value $\eta LB$ among a neighbor BS set $NE_k$ of the BS (k). The $HA_j$ is expressed as in Equation (25) below.

$$HA_j=\{i|\tilde{I}_{i,j}\geq\eta_{LB}, i\in NE_k\} \quad (25)$$

In step 110, the BS (k) determines a terminal set $H_{k,i}$ meeting Equation (26) below and performing handover from the BS (k) to the neighbor BS (i).

$$\left\{\bigcup_{i\in HA_j} H_{k,i}\right\}\cap\{j\}=\{j\}, \quad (26)$$

$$\left\{\bigcup_{i\in (NE_k\cup\{k\})-HA_j} H_{k,i}\right\}\cap\{j\}=\phi, \bigcap_{i\in HA_j} H_{k,i}=\phi$$

In step 112, the BS (k) determines a mean load $\hat{L}^*(p^*_k, H_{k,i})$ of the entire cell for the terminal set $H_{k,i}$ meeting Equation (26) above and performing handover from the BS (k) to the neighbor BS (i).

Next, in step 114, the BS (k) determines a terminal set to do power control and handover from the determined mean load $\hat{L}^*(p^*_k, H_{k,i})$ of the entire cell, and performs power control and handover.

Figure 2:
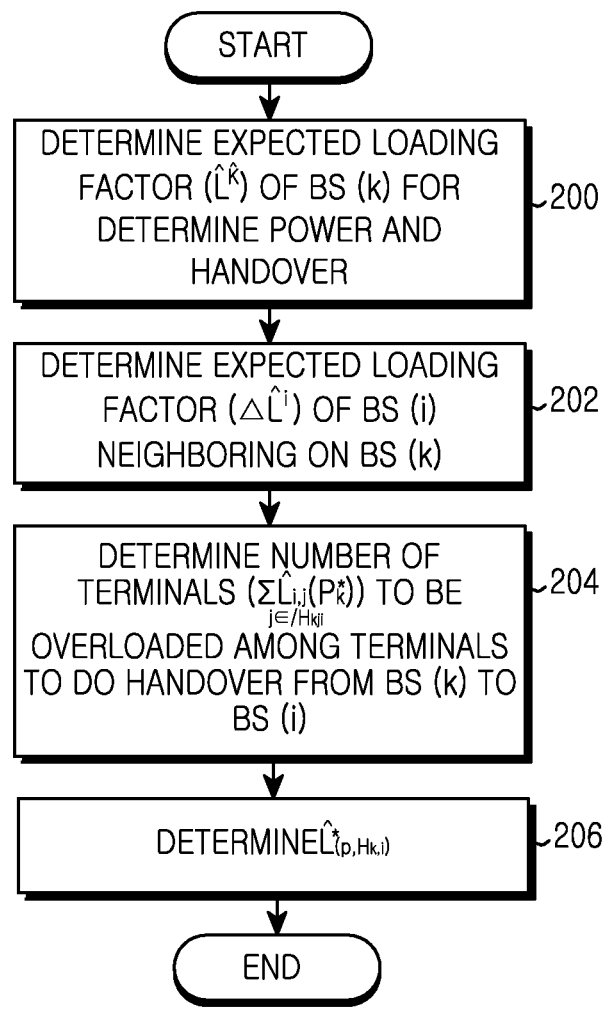
FIG. 2 illustrates a process of determining a mean load of the entire cell according to an embodiment of the present invention.

FIG. 2 illustrates a detailed process of determining a mean load of the entire cell according to an embodiment of the present invention.

Referring to FIG. 2, in step 200, a BS (k) determines its own expected loading factor $\hat{L}^k$ as in Equation (27) below.

$$\hat{L}^{\hat{k}} = \sum_{j\in U_{\hat{k}}}\hat{L}_{\hat{k},j} = \sum_{j\in U_{\hat{k}}} u\left(\frac{\lambda_j}{\hat{r}_{\hat{k},j}}\right) \quad (27)$$

Here, $$U_{\hat{k}} = U_k - \left[\bigcup_{i\in NE_k} H_{k,i}\right]$$

and the $\tilde{r}_{\hat{k},j}$ is determined as in Equation (28) below.

$$\hat{r}_{\hat{k},j} = \alpha_{\hat{k}}\alpha'_{\hat{k}}\log_2\left(a+\beta_{\hat{k}}\hat{I}_{\hat{k},j}\right) \quad (28)$$

$$= \frac{W}{|U_{\hat{k}}|}\alpha'_{\hat{k}}(|U_{\hat{k}}|)\log\left(a+\beta_{\hat{k}}(|U_{\hat{k}}|)\hat{I}_{\hat{k},j}\right)$$

$$= \frac{W}{|U_{\hat{k}}|}\alpha'_{\hat{k}}(|U_{\hat{k}}|)\log_2\left(a+\beta_{\hat{k}}(|U_{\hat{k}}|)\frac{|h_{k,j}|^2 p_k}{\sum_{i=1,i\neq k}^{N_{eNB}}|h_{i,j}|^2 p_i + n}\right)$$

That is, it is assumed that, among terminals serviced by the original BS (k), terminals included in a set $$U_{\hat{k}} = U_k - \left[\bigcup_{i\in NE_k} H_{k,i}\right]$$

of terminals not performing handover are reporting a signal strength of a neighbor BS received by each of the terminals to the BS (k), so a mean transmission rate expected to be serviced from the BS (k) for the respective terminals belonging to the $U_{\hat{k}}$ can be estimated as in Equation (28) above. Values used in Equation 28 above are an expected SINR $\tilde{I}_{\hat{k},j}$ of each terminal and the number $|U_{\hat{k}}|$ of simultaneously scheduled terminals. All these values are information that can be determined by the BS (k).

In step 202, the BS (k) determines an expected load value $\Delta\hat{L}^i$ ($\forall i\in NE_k$) of a neighbor BS (i) based on the following expressions. Here, $\Delta p_k=p^*_k/p_k$.

if $\Delta p_k > (\Delta p_k^{|H_{k,i}|})^+$ then $\Delta \hat{L}^i = +K$ else if $\Delta p_k < (\Delta p_k^{|H_{k,i}|})^-$ then $\Delta \hat{L}^i = -K$ else $\Delta \hat{L}^i = 0$ That is, when the $\Delta p_k$ is greater than the $(\Delta p_k^{|H_{k,i}|})^+$ using the $(\Delta p_k^{|H_{k,i}|})^+$ and $(\Delta p_k^{|H_{k,i}|})^-$ previously determined in step 102 of FIG. 1 and exchanged between respective BSs, the BS (k) determines that a load of the neighbor BS (i) increases as much as 'K'. When the $\Delta p_k$ is less than the $(\Delta p_k^{|H_{k,i}|})^-$, the BS (k) determines that the load of the neighbor BS (i) decreases as much as 'K'. In other words, the $(\Delta p_k^{|H_{k,i}|})^+$ is a power threshold value by which, when the BS (k) makes as many terminals as $|H_{k,i}|$ perform handover to a neighbor BS (i) and the terminals of $|H_{k,i}|$ number will increase to the neighbor BS (i) from a neighbor BS (i) standpoint, terminals of 'K' number among terminals meeting a minimum requirement transmission rate of the neighbor BS (i) become overload terminals due to a variation of power of the BS (k). The $(\Delta p_k^{|H_{k,i}|})^-$ is a power threshold value by which, when the BS (k) makes as many terminals as $|H_{k,i}|$ perform handover to the neighbor BS (i) and the terminals of $|H_{k,i}|$ number will increase to the neighbor BS (i) from the neighbor BS (i) standpoint, terminals of 'K' number among overload terminals of the neighbor BS (i) become terminals meeting a minimum requirement transmission rate due to the variation of power of the BS (k).

After that, in step 204, the BS (k) determines the number $$\sum_{j \in H_{k,i}} \hat{L}_{i,j}(p_k^*) \bigg|_{i \in NE_k - \{k\}}$$

of terminals that will be overloaded in the neighbor BS (i) among terminals that will perform handover from the BS (k) to the neighbor BS (i). The $$\sum_{j \in H_{k,i}} \hat{L}_{i,j}(p_k^*) \bigg|_{i \in NE_k - \{k\}}$$

is determined as in Equation (29) below.

$$\sum_{j \in H_{k,j}} \hat{L}_{i,j}(p) = \sum_{j \in H_{k,j}} u\left(\frac{\lambda_j}{\hat{r}_{i,j}(p)}\right) \quad (29)$$

Here, $U_i = U_i \cup H_{k,i}$, and the $\tilde{r}_{i,j}$ is determined as in Equation (30) below.

$$\hat{r}_{i,j} = \alpha_i \alpha'_i \log_2\left(a + \beta_i \hat{I}_{i,j}\right) \quad (30)$$

$$= \frac{W}{|U_i|} \alpha'_i(|U_i|) \log_2\left(a + \beta_i(|U_i|) \hat{I}_{i,j}\right)$$

$$= \frac{W}{|U_i|} \alpha'_i(|U_i|) \log_2\left(a + \beta_i(|U_i|) \frac{|\overline{h_{i,j}}|^2 p_i}{\sum_{l=1, l \ne i,k}^{N_{eNB}} |\overline{h_{i,j}}|^2 p_l + |\overline{h_{k,j}}|^2 p + n}\right)$$

That is, the BS (k) determines a mean throughput expected in a case where a terminal doing handover from a BS (k) to a neighbor BS (i) will be serviced in the neighbor BS (i) and, based on this, determines whether a corresponding terminal will be overloaded. In this process, because the BS (k) is aware of signal strengths of all BSs necessary for SINR determination and can expect even the number of terminals to be serviced in the neighbor BS (i), the BS (k) can determine a mean throughput of a terminal that will perform handover from the BS (i) to the neighbor BS (i) through Equation (30) above.

After that, in step 206, the BS (k) determines $\hat{L}^*(p, H_{k,i})$ with respect to p and $H_{k,i} \forall i \in NE_k$ using the result determined in steps 200 to 204, as in Equation (31) below.

$$\hat{L}^*(p, H_{k,i}) = \frac{1}{N_{eNB}} \left[ \left( \sum_{j \in U_k - \left[\bigcup_{i=1, i \ne k}^{N_{eNB}} H_{k,i}\right]} \hat{L}_{k,j}(p) \right)^2 + \right. \quad (31)$$

$$\left. \sum_{i=1, i \ne k}^{N_{eNB}} \left\{ (\hat{L}^i + \Delta \hat{L}^i(p, |H_{k,i}|)) + \sum_{j \in H_{k,i}} \hat{L}_{i,j}(p) \right\}^2 \right]$$

If a $\hat{L}^*(p, H_{k,i})$ value is less than $L_{min}$, the BS (k) updates the $L_{min}$, $p^*_k$, and $H^*_{k,i}$ as in Equation (32) below.

$$L_{min} = \hat{L}^*(p, H_{k,i})$$

$$p^*_k = p$$

$$H^*_{k,i} = H_{k,i} \forall i \in NE_k \quad (32)$$

The BS (k) sets power of the BS (k) as $p_k = p^*_k$ using the determined $L_{min}$, $p^*_k$, and $H^*_{k,i}$ and, with respect to the BS (k) and $NE_k$, the BS (k) performs handover to have its user set as in Equations (33) and (34) below.

$$U_k = U_k - \left[\bigcup_{i \in NE_k} H^*_{k,i}\right] \quad (33)$$

$$U_i = U_i \cup H^*_{k,i} \forall i \in NE_k \quad (34)$$

Figure 3:
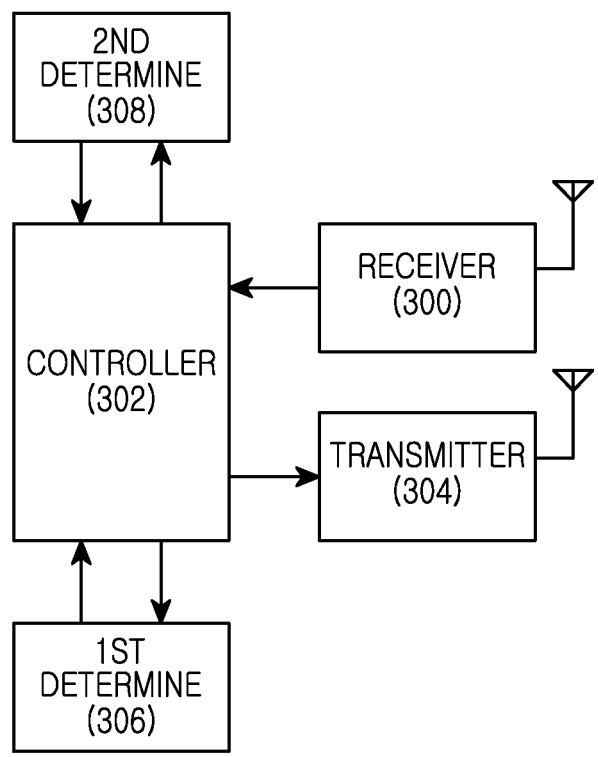
FIG. 3 illustrates a construction of an apparatus for power control and load balancing based on load estimation of a neighbor cell in a wireless communication system according to an embodiment of the present invention.

FIG. 3 illustrates a construction of a BS apparatus for power control and load balancing based on load estimation of a neighbor cell in a wireless communication system according to an embodiment of the present invention.

Referring to FIG. 3, the BS apparatus includes a receiver 300, a controller 302, a transmitter 304, a first determiner 306, and a second determiner 308.

The receiver 300 frequency down converts a Radio Frequency (RF) signal received through an antenna into a baseband analog signal, converts the analog signal into a digital signal to perform signal processing, and provides the result to the controller 302. For example, the signal processing, for example, the receiver 300 processes a time domain signal by Fast Fourier Transform to convert the time domain signal into a frequency domain signal, selects data of subcarriers intended to receive from frequency domain data, and processes the selected data by demodulation and decoding according to a predefined modulation level (i.e., a Modulation Coding Scheme (MCS) level).

The controller 302 takes charge of the general control of a BS. Particularly, in the present invention, in addition, the controller 302 controls power control and handover based on load estimation of a neighbor cell.

For this, the controller 302 first determines information for power control and load balancing through neighbor BS load estimation, and transmits the information to a neighbor BS through the transmitter 304. According to realization, the information can be transmitted to the neighbor BS through a backbone. The information includes the number $|U_k|$ of terminals serviced by a BS (k), the number $L_k$ of overload terminals among terminals serviced by the BS (k), a backoff counter $BO_k$ of the BS (k), a power variation $(\Delta p_i^{|H_{i,k}|})^+$ of a neighbor BS (i) of increasing by 'K' number, an overload terminal of the BS (k) with respect to each $|H_{i,k}|$ when the number $|H_{i,k}|$ of terminals expected to perform a handover from the neighbor BS (i) neighboring on the BS (k) to the BS (k) has a value between [0, H−1], and a power variation $(\Delta p_i^{|H_{i,k}|})^-$ of the neighbor BS (i) of decreasing, by 'K' number, the overload terminal of the BS (k) with respect to each $|H_{i,k}|$ when the number $|H_{i,k}|$ of terminals expected to perform a handover from the neighbor BS (i) neighboring on the BS (k) to the BS (k) has a value between [0, H−1].

The controller 302 receives the following information through the receiver 300. The following information includes the number $|U_i|$ of terminals serviced from a plurality of neighbor BSs (i), the number $L_i$ of overload terminals among terminals serviced by the neighbor BS (i), a backoff counter $BO_i$ of the neighbor BS (i), a power variation $(\Delta p_k^{|H_{k,i}|})^+$ of the BS (k) of increasing, by 'K' number, an overload terminal of the neighbor BS (i) with respect to each $|H_{k,i}|$ when the number $|H_{k,i}|$ of terminals expected to perform a handover from the BS (k) neighboring on the neighbor BS (i) to the neighbor BS (i) has a value between [0, H−1], and a power variation $(\Delta p_k^{|H_{k,i}|})^-$ of the BS (k) of decreasing, by 'K' number, the overload terminal of the neighbor BS (i) with respect to each $|H_{k,i}|$ when the number $|H_{k,i}|$ of terminals expected to perform the handover from the BS (k) neighboring on the neighbor BS (i) to the neighbor BS (i) has a value between [0, H−1].

Also, the controller 302 determines a mean load $\hat{L}^* = (p^*_k, H_{k,i})$ of the entire cell for all $H_{k,i}$ determined by the second determiner 308, determines a terminal set to perform power control and handover, and performs the power control and handover. A process of determining the mean load of the entire cell refers to FIG. 2 above.

The 1st determiner 306 receives corresponding information from the controller 302 and, based on a loading factor of a neighbor BS (i), i.e., the number $L_i$ of overload terminals of the neighbor BS (i), the 1st determiner 306 determines whether itself will control power and handover. That is, the first determiner 306 determines whether the number of overload terminals is relatively large compared to a neighbor BS based on Equation (24) above and, when the number of its own overload terminals is large, the first determiner 306 notifies the controller 302 that it has to control power and handover. In contrast, when the number of overload terminals of a corresponding neighbor BS is large, the first determiner 306 controls power and handover in a corresponding neighbor BS.

If the first determiner 306 determines to control power and handover, the second determiner 308 determines a BS set $HA_j$ in which a mean SINR value $\bar{I}_{i,j}$ of a terminal (j) ($j \in U_k$) is greater than a threshold value $\eta LB$, and provides the result to the controller 302. That is, the $HA_j$ is the BS set in which the mean SINR value $\bar{I}_{i,j}$ of the terminal (j) is greater than the threshold value $\eta LB$ among a neighbor BS set $NE_k$ of the BS (k). The $HA_j$ is expressed as in Equation (25) above.

Also, the second determiner 308 determines a terminal set $H_{k,i}$ meeting Equation (26) above and performing a handover from the BS (k) to the neighbor BS (i).

The transmitter 304 processes a signal received from the controller 302 and transmits the signal through an antenna. For example, the transmitter 304 encodes and modulates a signal according to a predefined modulation level (i.e., an MCS level), processes a frequency domain signal by Inverse Fast Fourier Transform, and converts the frequency domain signal into a time domain sample signal. The transmitter 304 converts the sample signal into an analog signal, and frequency up modulates a baseband signal into an RF signal.

As aforementioned, the present invention can be arranged as follows.

1) A BS uses the sum of squares of the number of overload terminals of itself and its own neighbor BS, as an objective function of deciding power control and handover terminal set (that is, an object of minimizing a variance value of the number of overload terminals).

2) Assuming that a neighbor BS (i) of a BS (k) determines a terminal set to do power control and handover from the neighbor BS (i) to the BS (k), the BS (k) periodically estimates a power variation of the neighbor BS (i) varying the number of overload terminals of the BS (k) as much as a specific value and the number of terminals performing handover from the neighbor BS (i) to the BS (k).

3) When information estimated in the 2) is different from previous information, a BS transmits the information to a neighbor BS or receives information transmitted from the neighbor BS.

4) A BS adjusting power and serviced terminal set at a specific time point determines if each BS is independently selected with a specific period so that no more than neighbor BS exists.

5) To prevent a BS selected in the 4) from being continuously selected, the BS apparatus increases a backoff value of a terminal selected in step 4).

6) When the BS (k) varies a set of its own power and service terminal set using the information exchanged in step 3), the BS (k) estimates the number of overload terminals of a neighbor cell.

7) Each BS determines power and serviced terminal set minimizing the objective function using the result of step 4).

The performance of the present invention is described below. The performance of the proposal scheme differently applied a load in network situation where 19 BSs constitute 3 sectors. A system parameter is given as in Table 1 below.

TABLE 1

| System Parameter | | Note |
|---|---|---|
| Number of Cells | 19 | With 3 Sectors per cell |
| ISD | 500 m | |
| Number of UE per sector | 10 | |
| Antenna Configuration | SIMO(Single-Input Multiple-Output) | 1x2 MRC(Maximum Ratio Combine) |
| Carrier frequency | 2 GHz | |
| Bandwidth | 10 MHz | FFT: 1024, 50 RBs/slot |
| Hybrid Automatic Repeat reQuest (ARQ) | Chase Combining | Maximum number of retransmissions: Nr(max) = 3 |
| | | Number of HARQ process channel: 8 |
| BS Tx power | Max: 40 W(46 dBm), Min: 0.4 W(6 dBm) | |
| Lognormal shadowing | STD (Selection Transmit Diversity): 10 dB | |
| Channel Model | ITU-R Pedestrian B (3 km/h) | |
| Noise figure | 9 dB | |
| Scheduler | Proportional Fair | T = 1000 |

TABLE 1-continued

| System Parameter | | Note |
| --- | --- | --- |
| Traffic model | Scheduling Full buffer | |
| Link-to-system interface | Effective SNR: Mutual Information-based | Form IEEE802.16m EMD |
| Link adaptation | Adaptive modulation & coding | |
| Channel Quality Indicator (CQI) period | Reporting period: 2 ms | Actual period for each subband: 18 ms |

To differently apply the load, the results of three terminal distributions are compared.

Case 1) Uniformly distributes 10 terminals in the coverage of each sector by each sector.

Case 2) Uniformly distributes 570 terminals for the entire region.

Case 3) Uniformly distributes 28 terminals in the coverage of each of sectors 0, 19, and 38, and 9 terminals in the coverage of each of the remnant sectors.

That is, from Case 1) to Case 3), a distribution can be regarded in which the extent of load concentration becomes substantial.

To compare the performance of the disclosed scheme, comparison groups of a 'Normal' scheme not applying a load balancing scheme, a 'Global greedy' scheme of deciding power of a terminal and a BS one by one when all information of a network are centrally known, and a 'Prop' scheme presenting the disclosed scheme are compared.

Figure 4A:
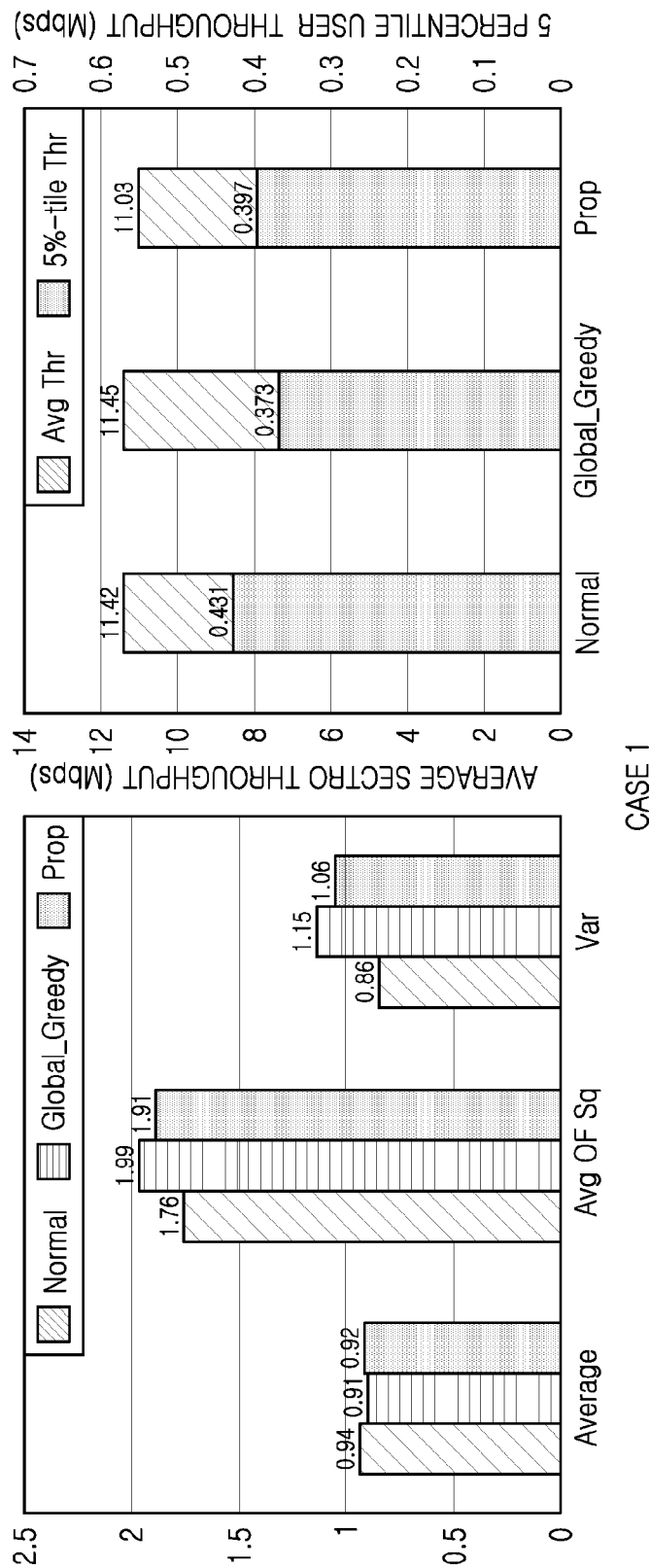
FIGS. 4 to 6 illustrate performance graphs according to the present invention.
Figure 4B:
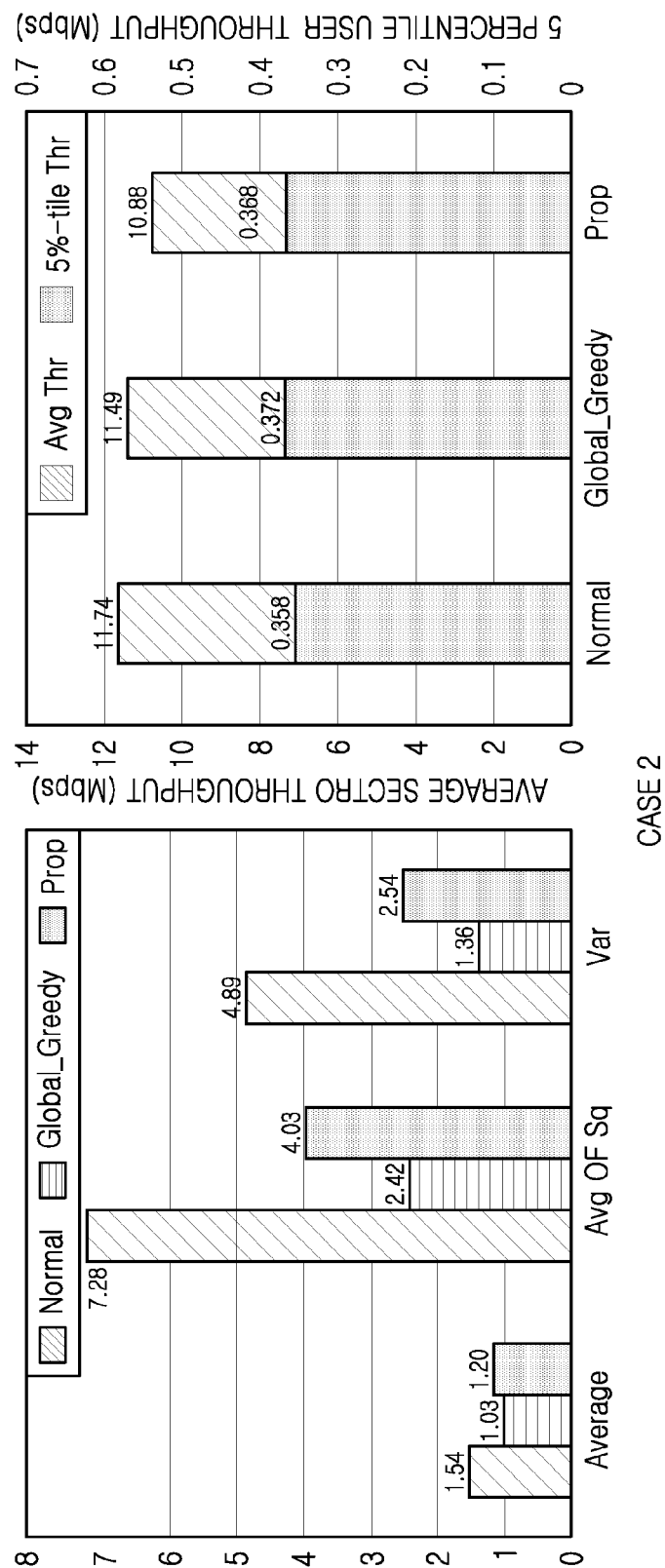
Figure 4C:
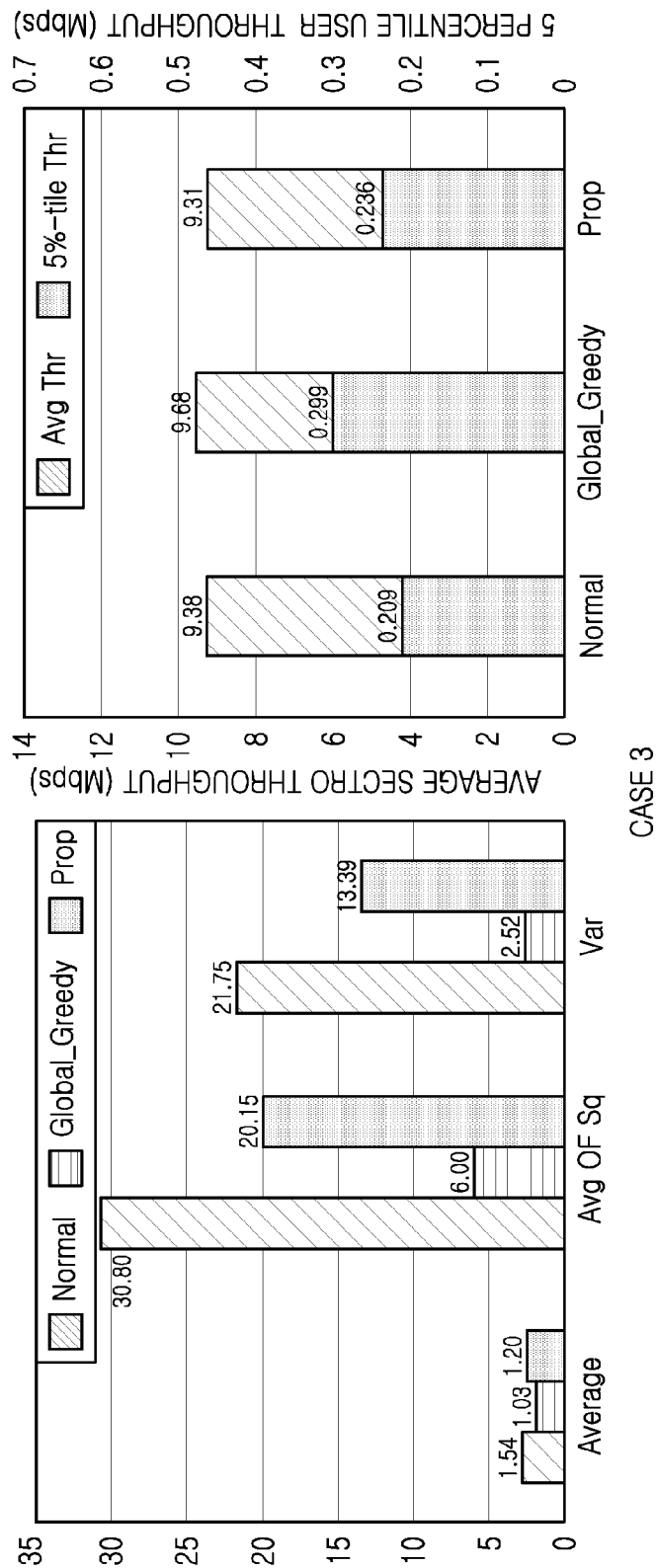
Figure 5A:
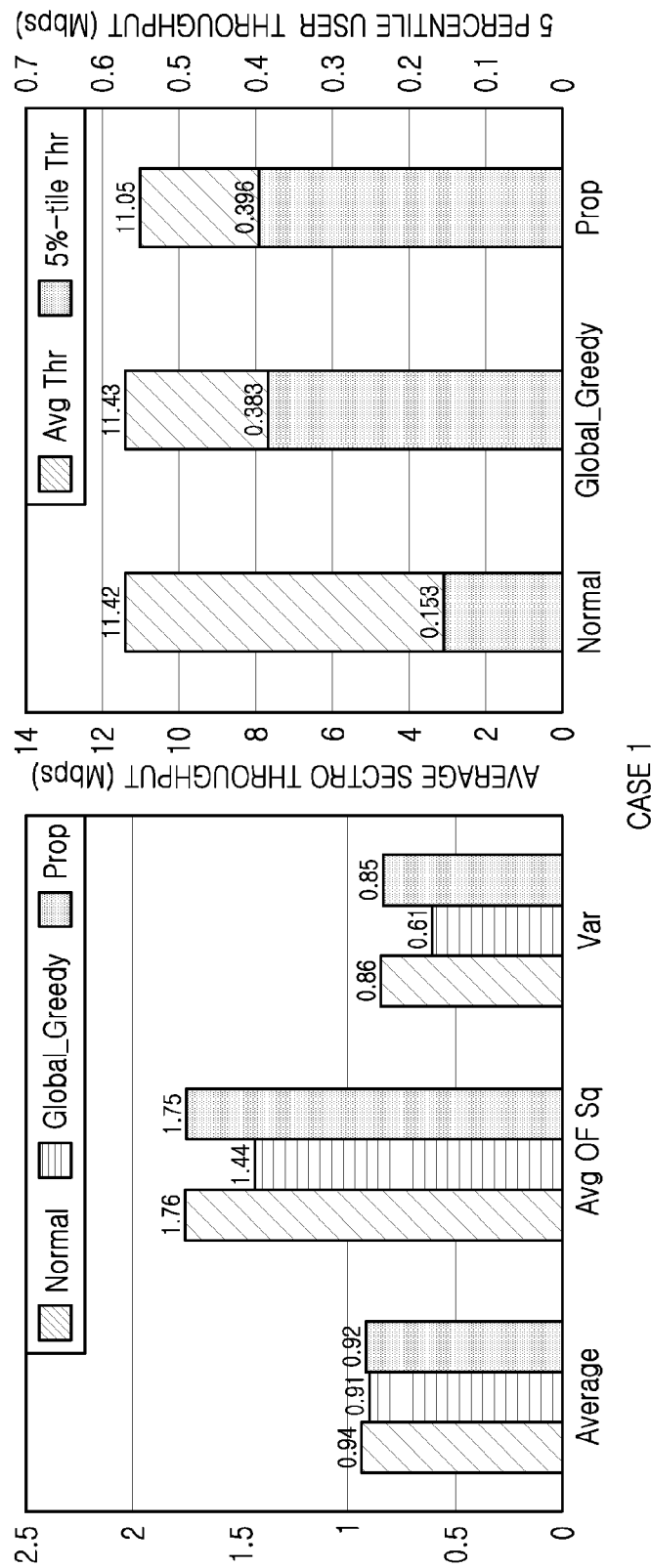
Figure 5B:
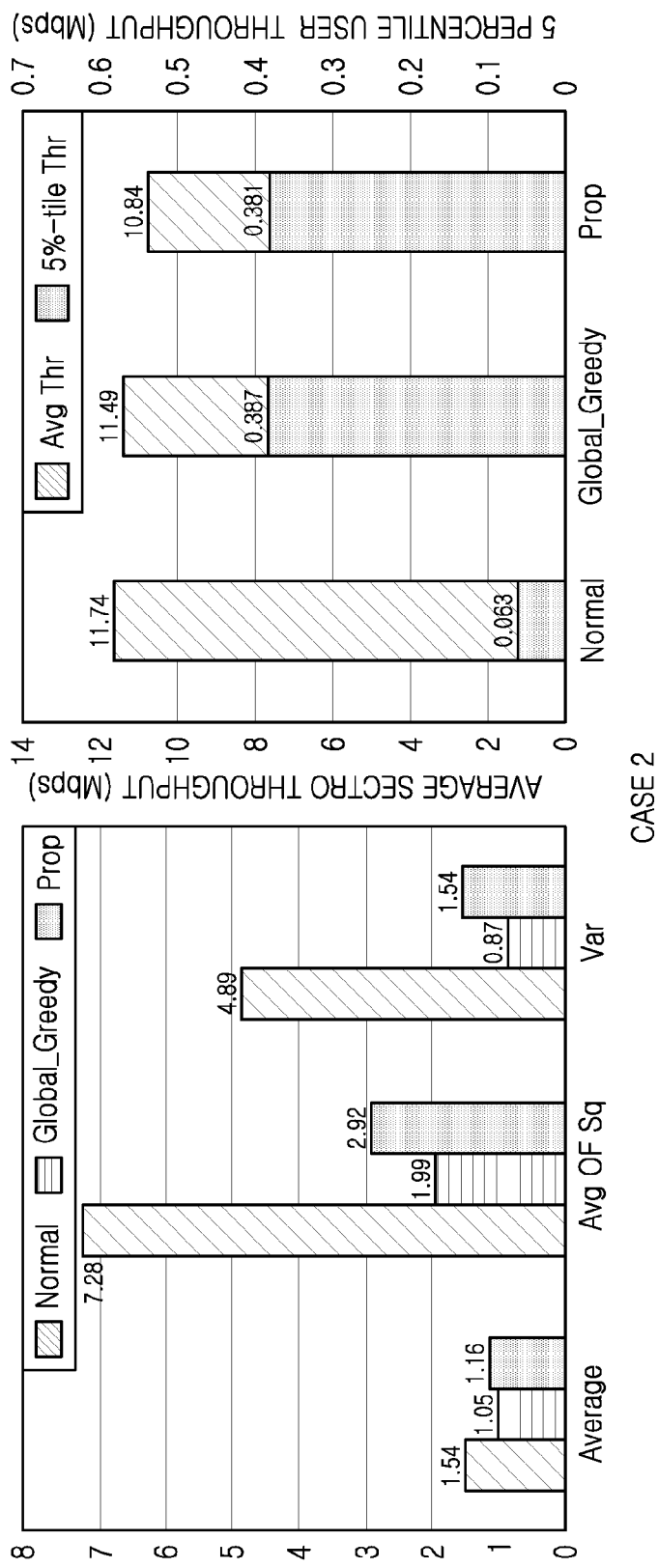
Figure 5C:
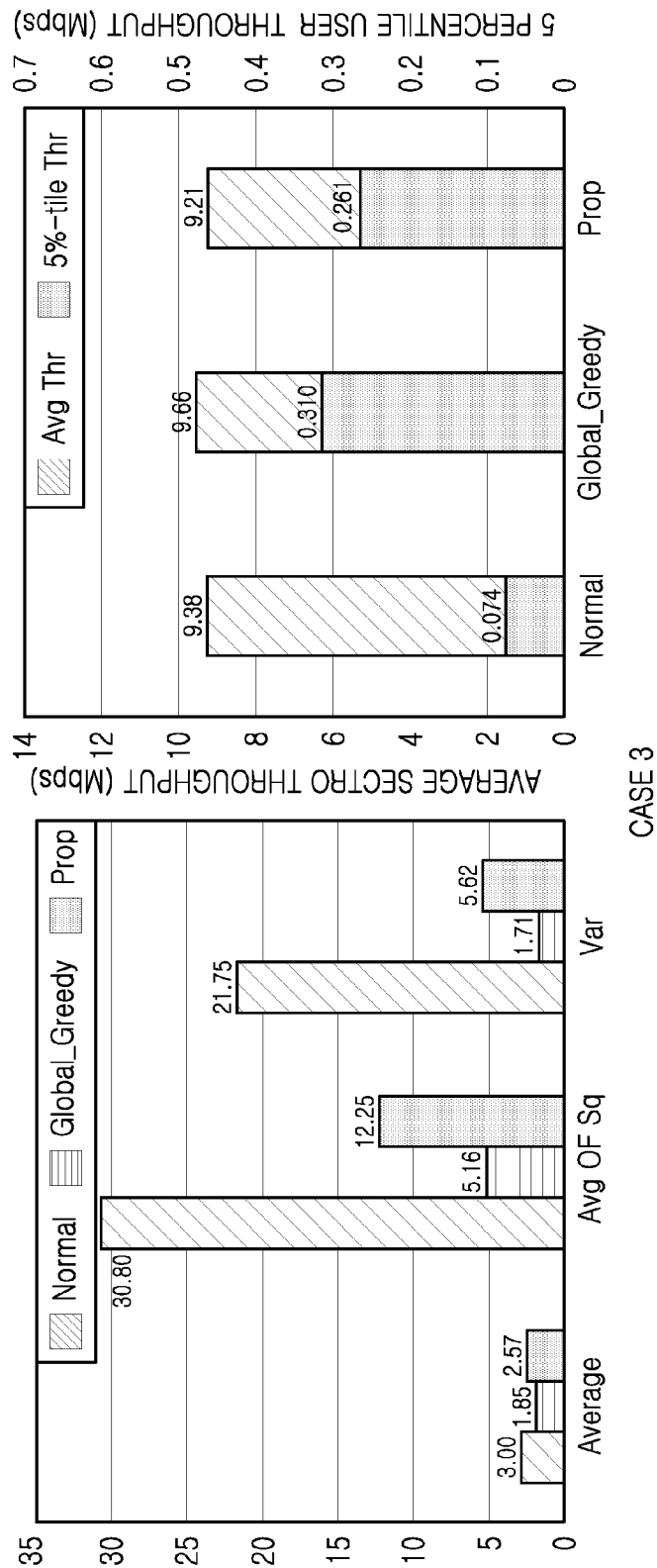

FIG. 4 is a result of applying the disclosed scheme with an objective function minimizing the sum of the number of overload terminals of the entire sector and, and FIG. 5 is a result of applying an objective function minimizing a mean of the square of the number of overload terminals per BS as in Equation 8 above.

A mean overload terminal count and throughput attenuation degree have no almost difference for all cases in FIGS. 4 and 5, while a variance of FIG. 4 is greater that that of FIG. 5. That is, by applying Equation 8 above, there is an effect of decreasing the number of entire overload terminals such as minimizing the number of entire overload terminals and simultaneously, there is an effect of decreasing a variance at a greater extent than minimizing the number of entire overload terminals.

Figure 6A:
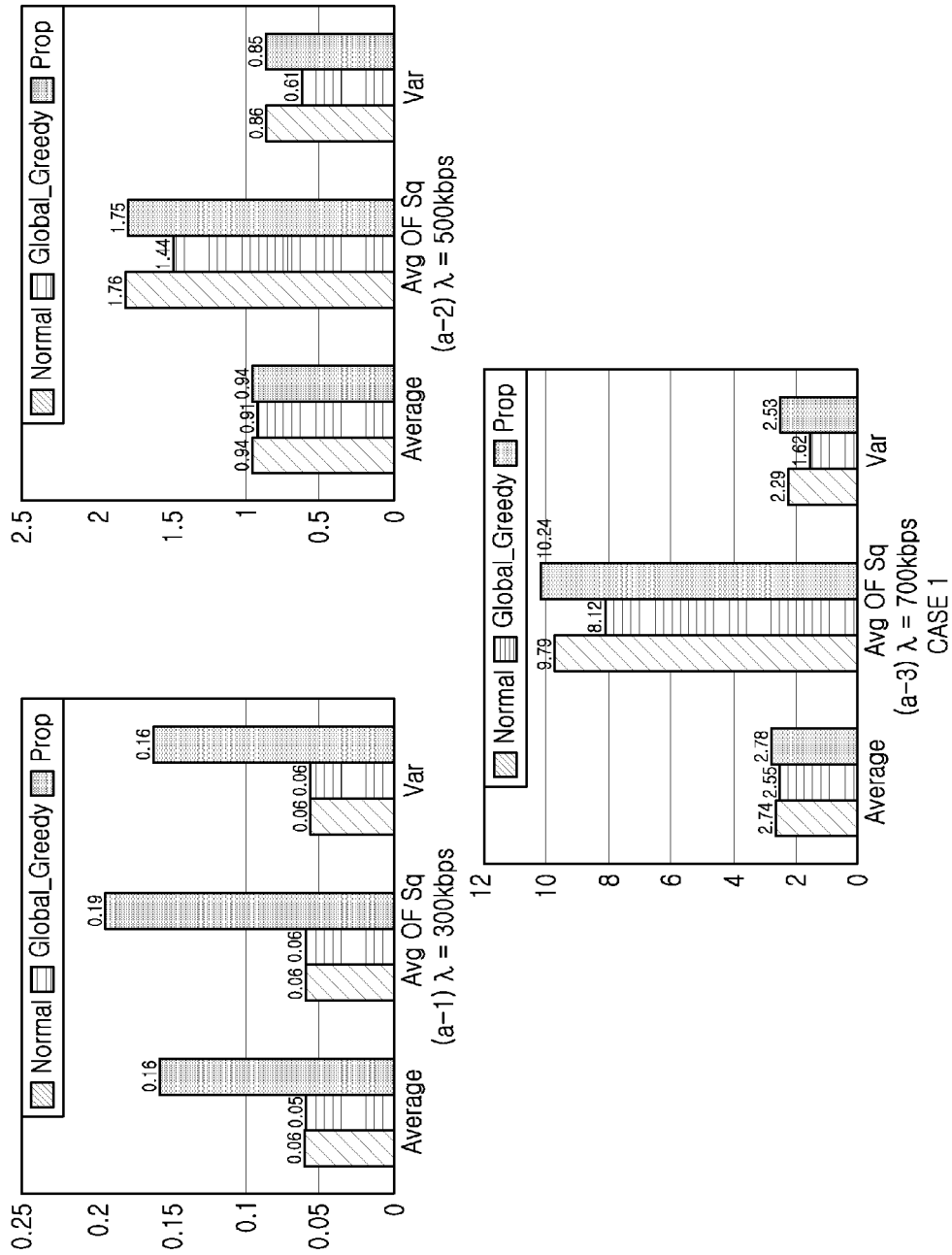
Figure 6B:
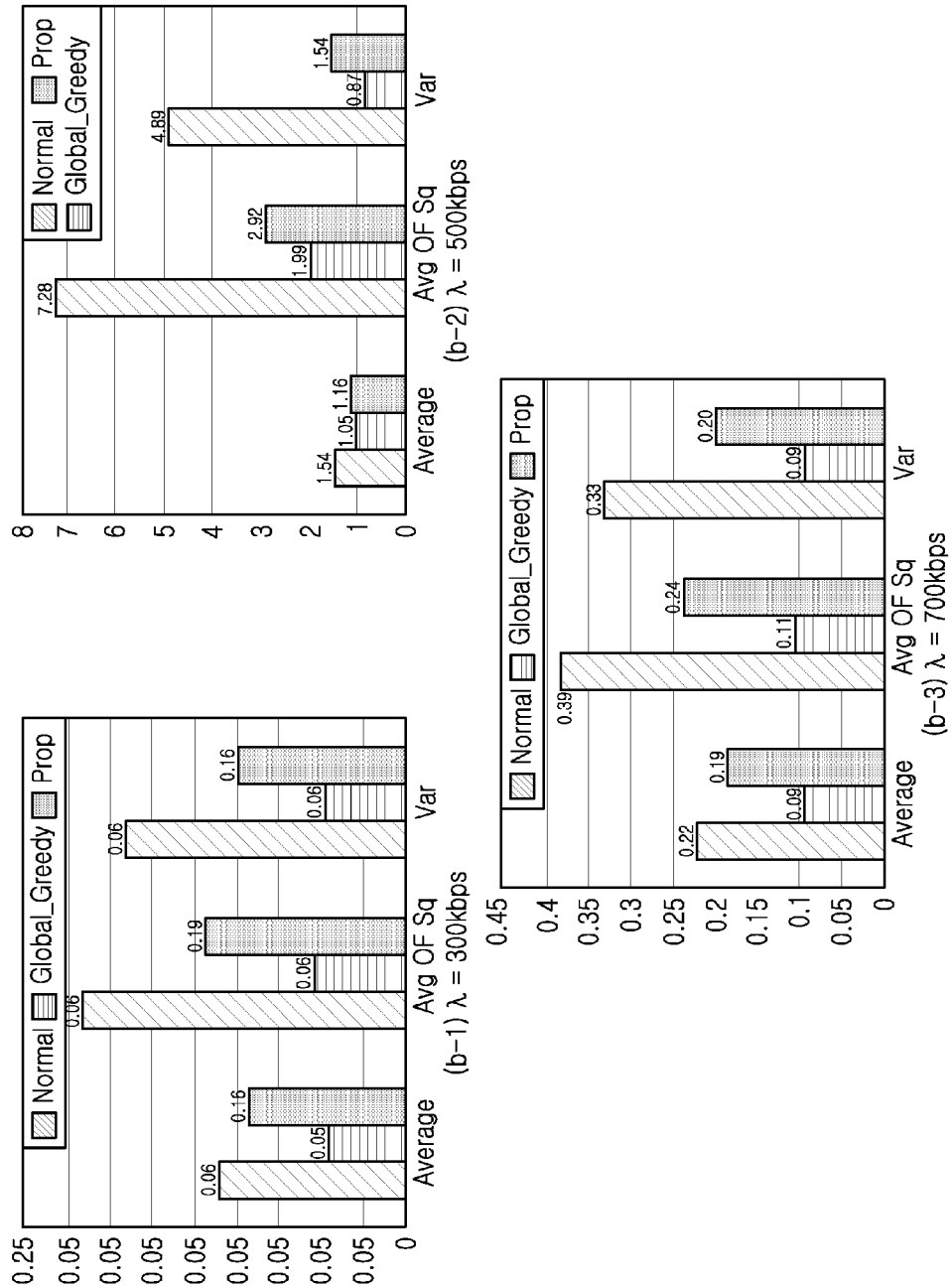
Figure 6C:
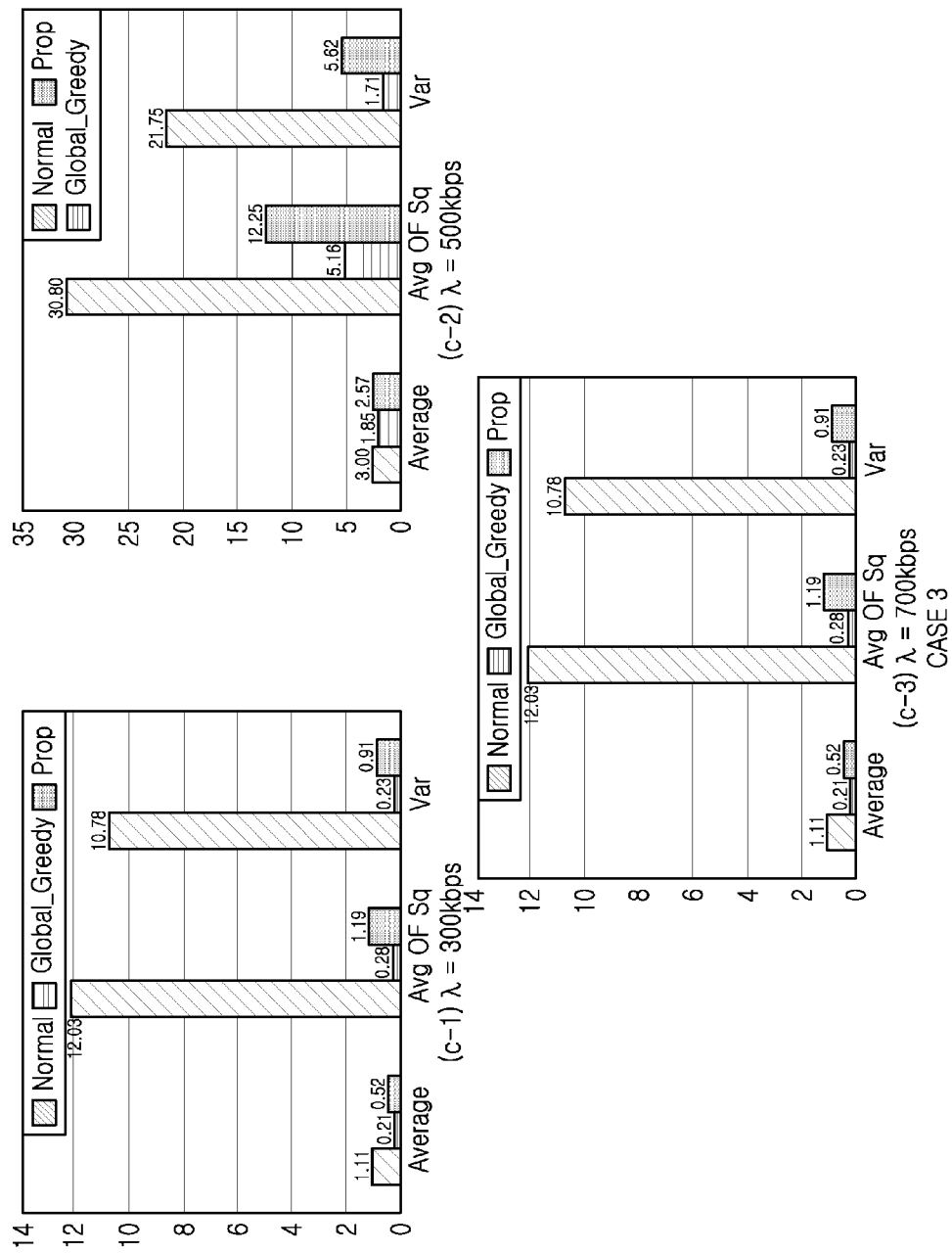

FIG. 6 is the result of load balancing by each instance when a minimum requirement transmission rate ($\lambda$) is set to 300, 500, and 700 kilo bits per second (kbps). The environment is that, as the '$\lambda$' is larger, overload terminals of greater number exist in the entire network and, as it proceeds from Case 1) to Case 3), the extent of load concentration on a specific sector is larger. From the result, in the (a-1), the performance of the 'Prop' scheme is instead worse than that of the 'Normal' scheme because an error occurred in estimating a loading factor by each sector in the situation itself of the (a-1) in which a gain of load balancing through inter-cell control is small since the number of overload terminals is less and also a distribution thereof is uniform.

In contrast, the best performance is shown in the (c-1) because a gain of load balancing obtainable through control between neighbor sectors is large since the number of entire overload terminals is less while most of the overload terminals are concentrated on a corresponding sector. The result is that the mean number of overload terminals to normal was decreased by about 52.2%, and a value of Equation 8 above was decreased by about 90.1%.

As described above, there is an advantage of, by exchanging information capable of estimating a load of a neighbor BS with BSs, capable of minimizing the sum of squares of the number of overload terminals per cell.

While the invention has been shown and described with reference to embodiments thereof, it will be understood by those skilled in the art that various changes in form and details may be made therein without departing from the spirit and scope of the invention as defined by the appended claims.

What is claimed is:

1. A method for operating a base station (BS) in a wireless communication system, the method comprising:

selecting at least one base station neighboring on the base station; and determining a power level and a handover terminal set including at least one terminal to be handed over from the base station to the neighboring base station based on an average load in the base station and the neighboring base station, wherein the average load is determined based on a number of overload users from among a first group of users serviced by the base station and a number of overload users from among a second group of users serviced by the neighboring base station wherein the average load is determined based on a first load value, a second load value and a third load value with respect to power controlled by the base station, wherein the first load value represents a number of overload terminals from among remaining terminals excepting terminals to be handed over from the base station to the neighboring base station from among the first group of terminals serviced by the base station, wherein the second load value represents a number of overload terminals from among a second group of terminals serviced by the neighboring base station, and wherein the third load value represents a number of terminals expected to be overloaded in the neighboring base station from among terminals to be handed over from the base station to the neighboring base station.

2. The method of claim 1, wherein determining the power level and the handover terminal set comprises:

determining the power level and the handover terminal set including the at least one terminal to be handed over from the base station to the neighboring base station such that the average load in the base station and the neighboring base station is minimized.

3. The method of claim 1, wherein the average load is determined by a sum of a square of a first value and a square of a second value, wherein the first value represents the first load value and the second value represents a square of a sum of the second load value and the third load value.

4. The method of claim 3, wherein the average load is determined by the following equation:

$$\hat{L}^*(p, H_{k,i}) = \frac{1}{N_{eNB}} \left[ \left( \sum_{j \in U_k - \left[ \bigcup_{i=1, i \neq k}^{N_{eNB}} H_{k,i} \right]} \hat{L}_{k,j}(p) \right)^2 + \right.$$

-continued $$\sum_{i=1,i\neq k}^{N_{eNB}}\left\{(\hat{L}^i+\Delta\hat{L}^i(p,|H_{k,i}|))+\sum_{j\in H_{k,i}}\hat{L}_{i,j}(p)\right\}^2\Bigg]$$

where $$\sum_{j\in U_k-\left[\overset{N_{eNB}}{\underset{i=1,i\neq k}{\|}}H_{k,j}\right]}\hat{L}_{k,j}(p_k^*)$$

represents the first load value, $$\sum_{j\in U}\hat{L}_{i,j}(p_k^*)$$

represents the second load value, and $$\sum_{j\in H_{k,i}}\hat{L}_{i,j}(p_k^*)$$

represents the third load value,
 where $N_{eNB}$ represents a total number of BSs,
 j represents a terminal index,
 k, i represents a BS index,
 $U_k$ represents a terminal set of BS (k),
 $\hat{L}_{k,j}(p)$ represents a load of BS (k) according to power control and handover,
 $\hat{L}^i$ represents a load of neighboring BS (i) according to power control and handover,
 $\Delta\hat{L}^i(p,|H_{k,i}|)$ represents a load of neighboring BS (i) increasing and decreasing according to power control and handover,
 $|H_{k,i}|$ represents a number of terminals performing handover from BS (k) to neighboring BS (i), and
 $\hat{L}_{i,j}(p)$ represents a load of BS (i) according to power control and handover.

5. The method of claim 1, wherein the second load value is determined by a sum of a load of the neighboring base station in a previous state, and a variation of a load of the neighboring base station in a current state in comparison with the load of the previous state according to a change of power and a handover terminal set in the base station.

6. The method of claim 5, wherein the average load is determined by the following equation:

$$\hat{L}^*(p,H_{k,i})=\frac{1}{N_{eNB}}\Bigg[\left(\sum_{j\in U_k-\left[\overset{N_{eNB}}{\underset{i=1,i\neq k}{\|}}H_{k,j}\right]}\hat{L}_{k,j}(p)\right)^2+$$

$$\sum_{i=1,i\neq k}^{N_{eNB}}\left\{(\hat{L}^i+\Delta\hat{L}^i(p,|H_{k,i}|))+\sum_{j\in H_{k,i}}\hat{L}_{i,j}(p)\right\}^2\Bigg]$$

where $$\sum_{j\in U_k-\left[\overset{N_{eNB}}{\underset{i=1,i\neq k}{\|}}H_{k,j}\right]}\hat{L}_{k,j}(p_k^*)$$

represents the first load value, $$\sum_{j\in H_{k,i}}\hat{L}_{i,j}(p_k^*)$$

represents the third load value,
 $\hat{L}^i$ represents the load of the neighboring base station in the previous state, and
 $\Delta\hat{L}^i(\Delta p_k,|H_{k,i}|)$ represents the variation of a load of the neighboring base station in the current state,
 where $N_{eNB}$ represents a total number of BSs,
 j represents a terminal index,
 k, i represents a BS index,
 $U_k$ represents a terminal set of BS (k),
 $\hat{L}_{k,j}(p)$ represents a load of BS (k) according to power control and handover,
 $|H_{k,i}|$ represents a number of terminals performing handover from BS (k) to neighboring BS (i), and
 $\hat{L}_{i,j}(p)$ represents a load of BS (i) according to power control and handover.

7. The method of claim 1, further comprising:
 exchanging information with the neighboring base station for load estimation.

8. The method of claim 7, wherein the information for load estimation includes at least one of:
 a number of terminals serviced by the neighboring BS;
 a number of overload terminals from among the terminals serviced by the neighboring BS;
 a backoff counter value for considering fairness when selecting a BS that determines power control and handover terminal set;
 a first power variation of the neighboring BS for increasing, by 'K' number, an overload terminal of the neighboring BS with respect to a number of terminals expected to perform a handover from the BS to the neighboring BS; and
 a second power variation of the neighboring BS for decreasing, by 'K' number, the overload terminal of the neighboring BS with respect to the number of terminals expected to perform the handover from the BS to the neighboring BS, K is a constant.

9. An apparatus of a base station (BS) in a wireless communication system, the apparatus comprising:
 a controller configured to select at least one base station neighboring on the base station, and determine a power level and a handover terminal set including at least one terminal to be handed over from the base station to the neighboring base station based on an average load in the base station and the neighboring base station,
 wherein the average load is determined based on a number of overload users from among a first group of users serviced by the base station and a number of overload users from among a second group of users serviced by the neighboring base station wherein the average load is determined based on a first load value, a second load value and a third load value with respect to power controlled by the base station, wherein the first load value represents a number of overload terminals from among remaining terminals excepting terminals to be handed over from the base station to the neighboring base station from among a first group of terminals serviced by the base station, wherein the second load value represents a number of overload terminals from among a second group of terminals serviced by the neighboring base station, and wherein the third load value represents a number of terminals expected to be overloaded in the neighboring base station from among terminals to be handed over from the base station to the neighboring base station.

10. The apparatus of claim 9, wherein
the controller is configured to determine the power level and the handover terminal set including the at least one terminal to be handed over from the base station to the neighboring base station such that the average load in the base station and the neighboring base station is minimized.

11. The apparatus of claim 9, wherein the average load is determined by a sum of a square of a first value and a square of a second value,
wherein the first value represents the first load value and the second value represents a square of a sum of the second load value and the third load value.

12. The apparatus of claim 11, wherein the average load is determined by the following equation:

$$\hat{L}^*(p_k^*, H_{k,i}) = \frac{1}{N_{eNB}} \left[ \left( \sum_{j \in U_k - \left[ \bigcup_{i=1, i \neq k}^{N_{eNB}} H_{k,j} \right]} \hat{L}_{k,j}(p_k^*) \right)^2 + \sum_{i=1, i \neq k}^{N_{eNB}} \left\{ \frac{\sum_{j \in U_i} \hat{L}_{i,j}(p_k^*) +}{\sum_{j \in H_{k,i}} \hat{L}_{i,j}(p_k^*)} \right\}^2 \right]$$

where $$\sum_{j \in U_k - \left[ \bigcup_{i=1, i \neq k}^{N_{eNB}} H_{k,j} \right]} \hat{L}_{k,j}(p_k^*)$$

represents the first load value, $$\sum_{j \in U} \hat{L}_{i,j}(p_k^*)$$

represents the second load value, and $$\sum_{j \in H_{k,i}} \hat{L}_{i,j}(p_k^*)$$

represents the third load value,
where $N_{eNB}$ represents a total number of BSs,
j represents a terminal index,
k, i represents a BS index,
$U_k$ represents a terminal set of BS (k),
$\hat{L}_{k,j}(p)$ represents a load of BS (k) according to power control and handover,
$\hat{L}^i$ represents a load of neighboring BS (i) according to power control and handover,
$\Delta \hat{L}^i(p, |H_{k,i}|)$ represents a load of neighboring BS (i) increasing and decreasing according to power control and handover,
$|H_{k,i}|$ represents a number of terminals performing handover from BS (k) to neighboring BS (i), and
$\hat{L}_{i,j}(p)$ represents a load of BS (i) according to power control and handover.

13. The apparatus of claim 9, wherein the second load value is determined by a sum of a load of the neighboring base station in a previous state, and a variation of a load of the neighboring base station in a current state in comparison with the load of the previous state according to a change of power and a handover terminal set in the base station.

14. The apparatus of claim 13, wherein the average load is determined by the following equation:

$$\hat{L}^*(p, H_{k,i}) = \frac{1}{N_{eNB}} \left[ \left( \sum_{j \in U_k - \left[ \bigcup_{i=1, i \neq k}^{N_{eNB}} H_{k,j} \right]} \hat{L}_{k,j}(p_k^*) \right)^2 + \sum_{i=1, i \neq k}^{N_{eNB}} \left\{ \frac{(\hat{L}^i + \Delta \hat{L}^i(p, |H_{k,i}|)) +}{\sum_{j \in H_{k,i}} \hat{L}_{i,j}(p)} \right\}^2 \right]$$

where $$\sum_{j \in U_k - \left[ \bigcup_{i=1, i \neq k}^{N_{eNB}} H_{k,j} \right]} \hat{L}_{k,j}(p_k^*)$$

represents the first load value, $$\sum_{j \in H_{k,i}} \hat{L}_{i,j}(p_k^*)$$

represents the third load value,
$\hat{L}^i$ represents the load of the neighboring base station in the previous state, and
$\Delta \hat{L}^i(\Delta p_k, |H_{k,i}|)$ represents the variation of a load of the neighboring base station in the current state,
where $N_{eNB}$ represents a total number of BSs,
j represents a terminal index,
k, i represents a BS index,
$U_k$ represents a terminal set of BS (k),
$\hat{L}_{i,j}(p)$ represents a load of BS (k) according to power control and handover,
$|H_{k,i}|$ represents a number of terminals performing handover from BS (k) to neighboring BS (i), and
$\hat{L}_{i,j}(p)$ represents a load of BS (i) according to power control and handover.

15. The apparatus of claim 9, further comprising:
a transceiver configured to exchange information for load estimation with the neighboring base station.

16. The apparatus of claim 15, wherein the information for load estimation includes at least one of:
- a number of terminals serviced by the neighboring BS;
- a number of overload terminals from among the terminals serviced by the neighboring BS;
- a backoff counter value for considering fairness when selecting a BS that determines power control and handover terminal set;
- a first power variation of the neighboring BS for increasing, by 'K' number, an overload terminal of the neighboring BS with respect to a number of terminals expected to perform a handover from the BS to the neighboring BS; and
- a second power variation of the neighboring BS for decreasing, by 'K' number, the overload terminal of the neighboring BS with respect to the number of terminals expected to perform the handover from the BS to the neighboring BS, K is a constant.

* * * * *